US006811382B2

(12) United States Patent
Buchanan et al.

(10) Patent No.: US 6,811,382 B2
(45) Date of Patent: Nov. 2, 2004

(54) INTEGRATED PUMPING SYSTEM FOR USE IN PUMPING A VARIETY OF FLUIDS

(75) Inventors: Steven E. Buchanan, Pearland, TX (US); Grigory L. Arauz, Missouri City, TX (US); Kenneth L. Havlinek, Houston, TX (US); Ashley Kishino, Houston, TX (US); Lawrence C. Lee, Pearland, TX (US); W. Keith Russell, Sugar Land, TX (US); Thomas H. Zimmerman, Katy, TX (US); Anthony F. Veneruso, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 338 days.

(21) Appl. No.: 09/970,337

(22) Filed: Oct. 3, 2001

(65) Prior Publication Data

US 2002/0066568 A1 Jun. 6, 2002

Related U.S. Application Data

(60) Provisional application No. 60/241,453, filed on Oct. 18, 2000, and provisional application No. 60/305,312, filed on Jul. 13, 2001.

(51) Int. Cl.[7] .......................... F04D 29/44; F04B 25/00; F04B 35/04; F04B 41/06

(52) U.S. Cl. .................... 417/244; 417/423.5; 417/426; 417/63; 415/199.1

(58) Field of Search ................................ 417/244, 426, 417/423.5, 366, 371, 63; 415/199.1, 199.2, 199.3

(56) References Cited

U.S. PATENT DOCUMENTS

| 5,209,650 A | * | 5/1993 | Lemieux ..................... 417/356 |
| 5,547,350 A | * | 8/1996 | Rawal et al. ................ 417/354 |
| 5,713,727 A | * | 2/1998 | Veronesi et al. ............ 417/356 |

FOREIGN PATENT DOCUMENTS

GB            2369862         12/2002

\* cited by examiner

*Primary Examiner*—Charles G. Freay
(74) *Attorney, Agent, or Firm*—Van Someren, PC; Jeffrey E. Griffin; Brigitte Jeffery Echols

(57) ABSTRACT

An integrated pumping system for use in environments, such as subterranean environments, to move a desired fluid from one location to another. The integrated pumping system comprises one or more stages that each have an integrated pump and motor. A controller may be utilized to individually control the one or more integrated pumps and motors.

29 Claims, 11 Drawing Sheets

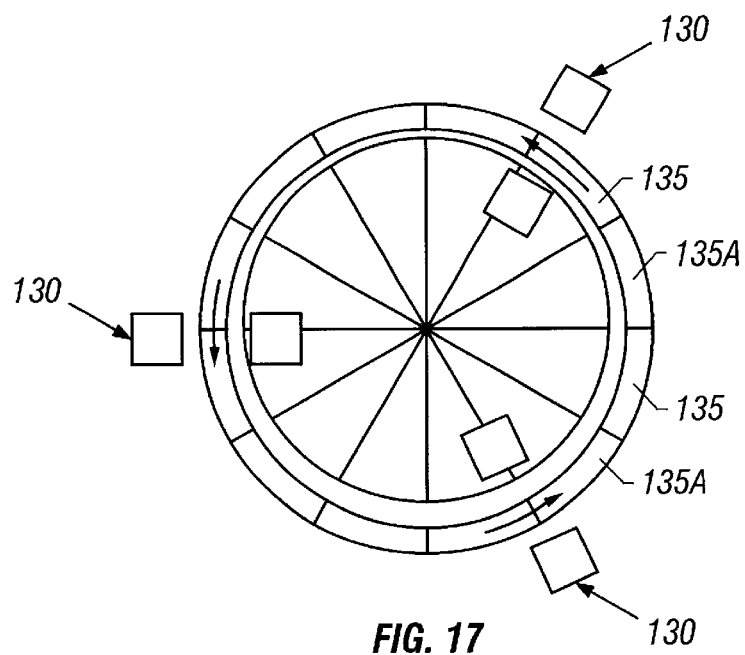
*FIG. 17*
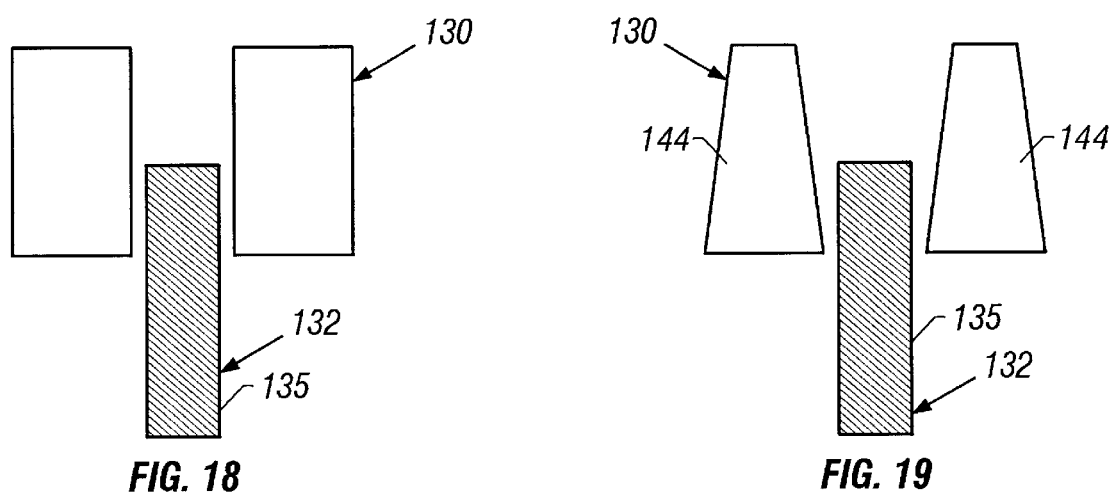
*FIG. 18*  *FIG. 19*

INTEGRATED PUMPING SYSTEM FOR USE IN PUMPING A VARIETY OF FLUIDS

This application claims priority under 35 U.S.C. § 119(e) to U.S. Provisional Application Ser. No. 60/241,453 filed Oct. 18, 200 and to U.S. Provisional Application Ser. No. 60/305,312 filed Jul. 13, 2001.

FIELD OF THE INVENTION

The present invention relates generally to the pumping of fluids, and particularly to the integration of a pump and electric motor to facilitate various aspects of moving fluid from one location to another.

BACKGROUND OF THE INVENTION

In a variety of pumping systems, such as electric submersible pumping systems utilized in the production of subterranean fluids, a distinct motor is used to drive a distinct and separate pump. In electric submersible pumping systems, a motor is coupled to a motor protector and ultimately to a submersible pump, such as a centrifugal pump. The motor protector separates the internal motor fluid from deleterious wellbore fluids, and the pump is driven by a shaft coupled to the electric motor. A variety of other components can be combined with the electric submersible pumping system for a range of applications and environments.

SUMMARY OF THE INVENTION

The present invention provides a technique for integrating the electric motor and the pump in various pumping systems. This combination permits the elimination of the separate motor, motor protector and other components while allowing greater control over movement of fluid as well as improved flexibility of design. Although the technique has particular application to systems used in subterranean environments, such as electric submersible pumping systems, the technique may be utilized in a variety of other pumping applications.

BRIEF DESCRIPTION OF THE DRAWINGS

The invention will hereafter be described with reference to the accompanying drawings, wherein like reference numerals denote like elements, and:

FIG. 17 is a top view of the stator illustrated in FIG. 16;

FIG. 18 is a schematic illustration of an exemplary solenoid gap profile; and

FIG. 19 is a schematic view of an alternate solenoid gap profile.

DETAILED DESCRIPTION OF THE PREFERRED EMBODIMENTS

Figure 1:
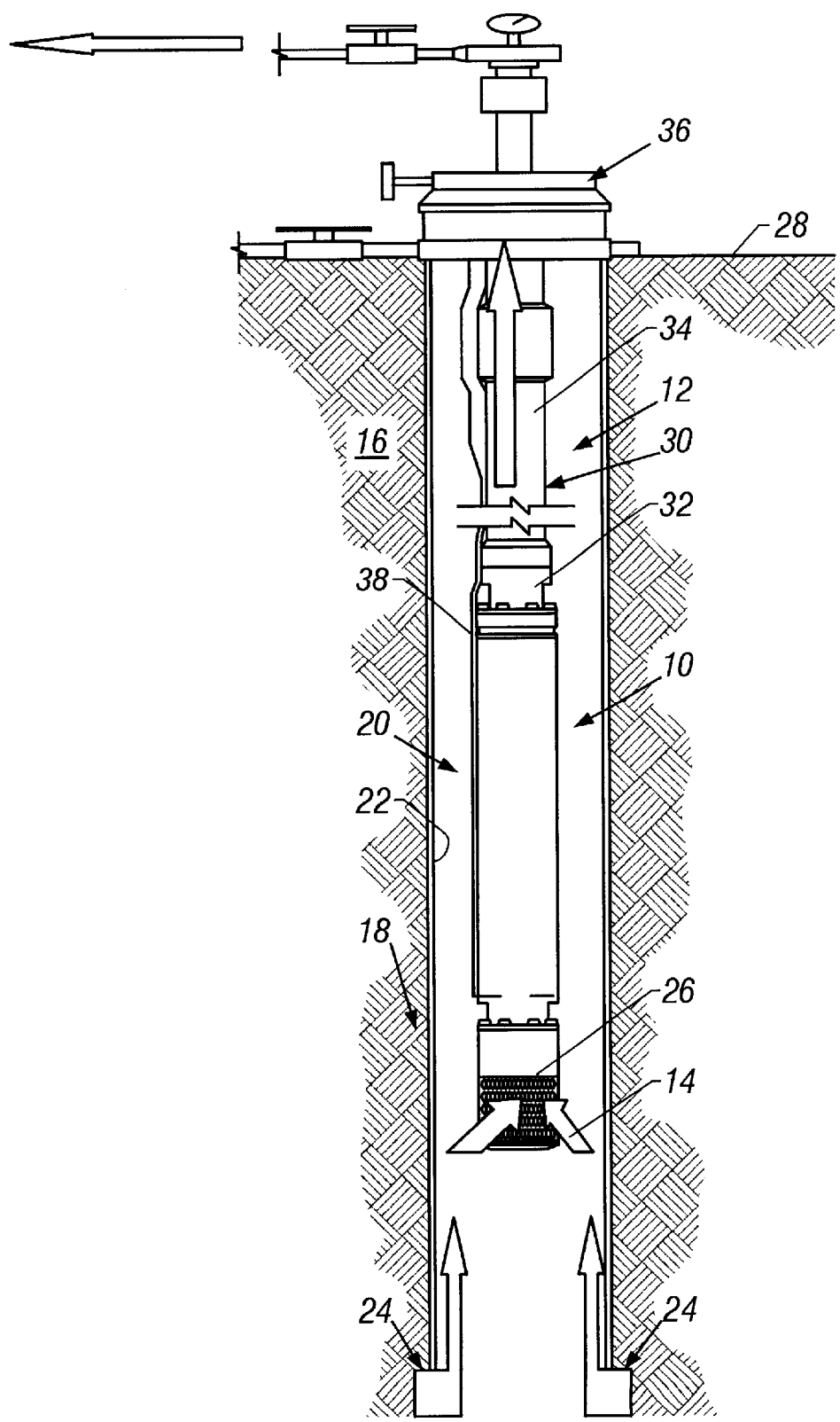
FIG. 1 is a front elevational view of an exemplary application of the present technique in a downhole, electric submersible pumping system.

Referring generally to FIG. 1, an integrated pumping system 10, is illustrated in a subterranean environment according to one embodiment of the present invention. In this embodiment, integrated system 10 is part of an overall electric submersible pumping system 12 deployed for producing certain production fluids 14, such as hydrocarbon-based fluids.

Integrated system 10 is deployed within a geological formation 16 for production of fluids from a well 18 via a wellbore 20 formed in the geological formation 16. Typically, wellbore 20 is lined with a wellbore casing 22 having an opening 24, e.g. perforations, through which wellbore fluids enter wellbore 20 from geological formation 16. After fluids 14 enter wellbore 20, they are drawn through a fluid intake 26 by integrated system 10 and produced to a desired location, such as a holding tank at a surface 28 of the earth.

In the embodiment illustrated, integrated system 10 is coupled to a deployment system 30 by a connector 32. Deployment system 30 may comprise a variety of configurations, such as cable, coiled tubing and production tubing. In FIG. 1, deployment system 30 comprises a tubing 34 through which wellbore fluids are produced. (In other designs, however, fluids are produced through the annulus formed in the wellbore around deployment system 30.) Tubing 34 is suspended from a wellhead 36 disposed, for example, proximate surface 28. Power is provided to integrated system 10 via a power cable 38.

Figure 2:
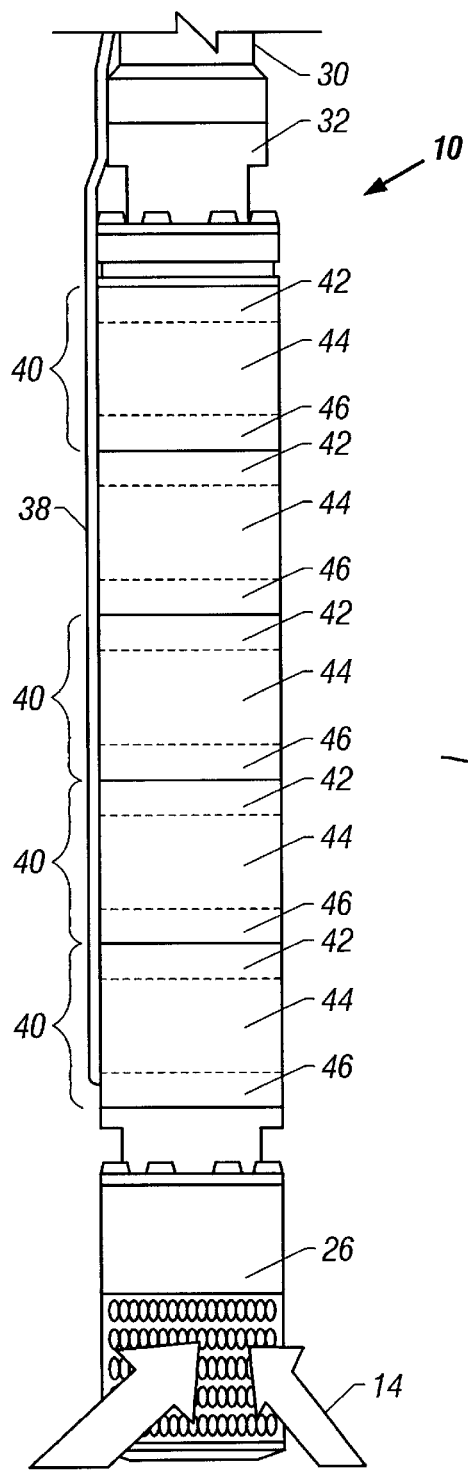
FIG. 2 is a front elevational view of the integrated motor and pump illustrated in FIG. 1.

As illustrated in FIG. 2, integrated system 10 comprises at least one stage 40 and typically a plurality of stages 40. The number and arrangement of stages can vary significantly from one application to another depending on the production environment, depth, fluid parameters and a variety of other design considerations. In the exemplary embodiment, each stage generally is divided into an impeller section 42, a motor section 44 and a diffuser section 46.

The plurality of stages 40 cooperate to move the desired production fluid 14. As fluid 14 is drawn through intake 26 into the first stage 40, the first diffuser 46 directs the fluid through appropriate channels in motor section 44 to impeller section 42. The impeller section 42 is rotated to propel fluid 14 to the next subsequent stage which moves the fluid to the next stage until ultimately the fluid is discharged into, for example, tubing 34. As will be explained more fully below, this integrated design allows for elimination of the drive shaft that would otherwise couple an electric motor to a separate pump. The design also eliminates the need for internal motor oil as well as elastomers, such as seals used to prevent loss of or contamination of the motor oil.

It should be noted that motor sections 44 can be utilized and controlled independently to rotate the various impellers at differing speeds or even in different directions as discussed in greater detail below. The use of integrated motor and pump sections allows for great flexibility of use and control over the pumping of fluid 14. In some designs, the individual stages 40 are configured as modular units that may be readily separated and recombined in a variety of arrangements and with a variety of components disposed therebetween (see FIG. 3).

Figure 3:
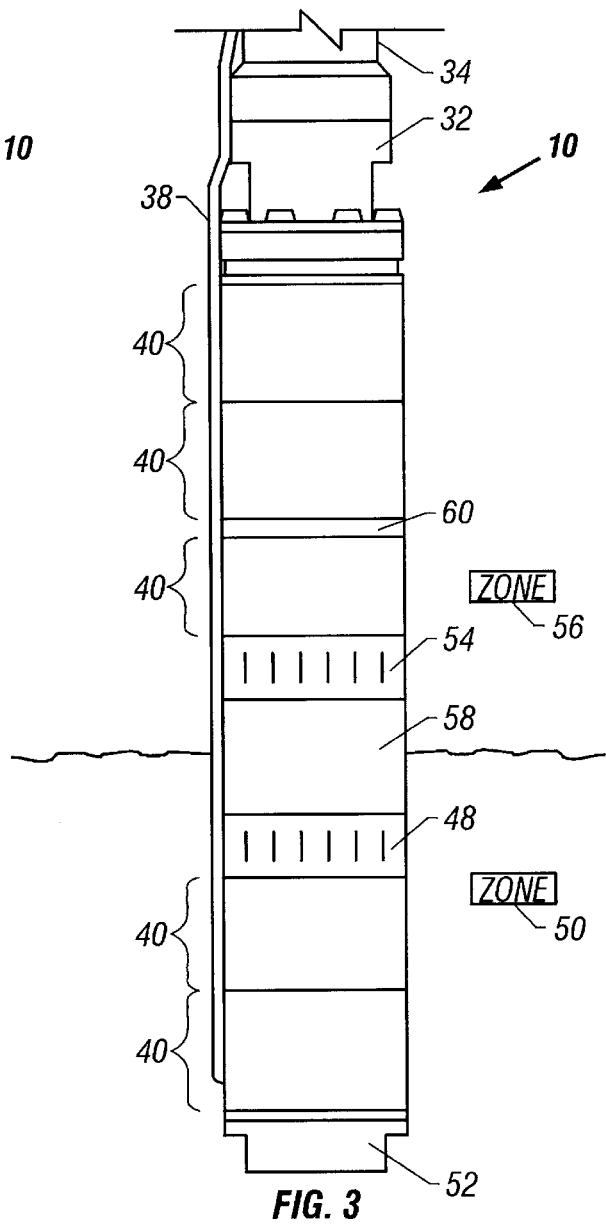
FIG. 3 is an alternate embodiment of the system illustrated in FIG. 2.

In the embodiment of FIG. 3, a plurality of stages 40 are separated by various components. For example, a plurality of lower stages are coupled to an integrated intake 48 that allows the stages to draw fluid into integrated system 10 from a first zone 50 and discharge the fluid downwardly through a discharge end 52. Simultaneously, a plurality of upper stages 40 are coupled to a second intake 54 positioned to draw fluid from an upper zone 56. The fluid drawn from zone 56 is produced upwardly through connector 32 and tubing 34. In this embodiment, a fluid separator 58 is disposed between intakes 48 and 54. Furthermore, a variety of other components, such as an instrumentation component 60, may be disposed between various stages 40. The embodiment illustrated in FIG. 3 is just one example of a wide variety of configurations facilitated by a modular design of stages 40 and overall integrated system 10.

To independently control the stages 40, a variety of control systems can be used, as illustrated in FIGS. 4 through 7. Generally, the exemplary techniques for providing power to stages 40 permit isolation of stages from other stages so that failure of one or more stages does not affect the others.

Figure 4:
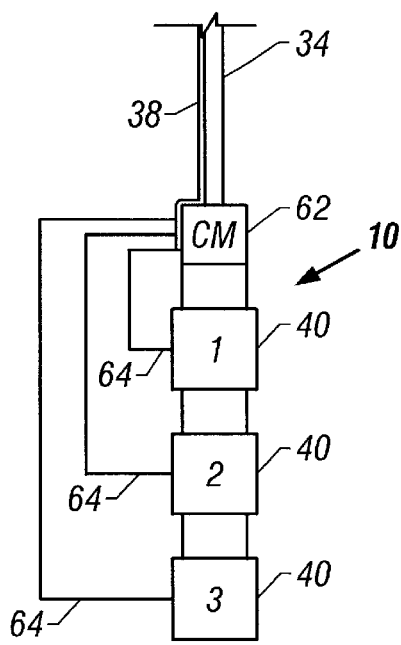
FIG. 4 is an exemplary electrical system utilized in controlling a plurality of stages in the integrated pumping system of FIG. 2.

In the example illustrated in FIG. 4, a control module 62 is coupled both to power cable 38 and to each stage 40, e.g. stages 1, 2 and 3, by a separate conductor 64. Control module 62 may be designed to convert the electrical input from series to parallel to permit individual control of the stages. Furthermore, conductor 64 may be deployed as independent electrical cables, such as each cable from the surface and without a control module 62, or as a bus running through integrated system 10.

Control module 62 typically is designed to electrically isolate each stage from the other stages such that when one stage fails, the remaining stages may be powered and operated. Additionally, control module 62 may be designed as a retrievable module deployed and retrieved through tubing 34. In lieu of control module 62, individual cables can be run from the surface to each of the stages. However, many applications benefit from the ability to use a single power cable 38 combined with control module 62 to separately control the relay of power to each of the individual stages 40.

Figure 5:
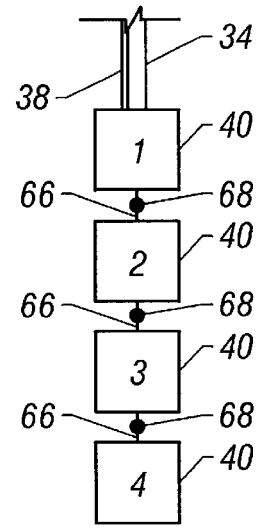
FIG. 5 is an alternate embodiment of the system illustrated in FIG. 4.

In an alternate embodiment, illustrated in FIG. 5, a series scheme can be utilized to power stages 40. In this design, stages 40 are electrically connected in series by a plurality of conductor segments 66. Each stage 40 is electrically isolated by an isolation device 68, such as a fuse or automatic switch. Thus, when one stage 40 fails, only the stages below it (as referenced in FIG. 5) are electrically separated from power cable 38. The stages above the failed stage remain in operation.

Figure 6:
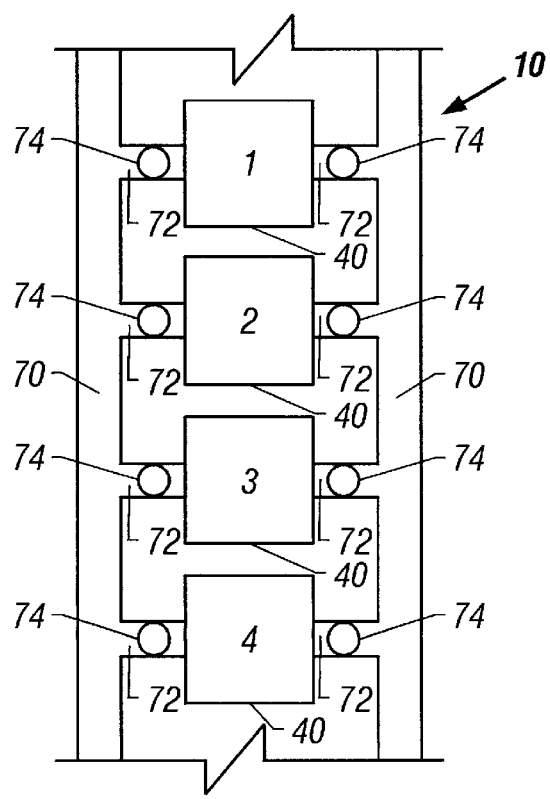
FIG. 6 is another alternate embodiment of the system illustrated in FIG. 4.

In another alternate embodiment, illustrated in FIG. 6, a ladder scheme is utilized to provide power to the various stages 40. In this embodiment, a pair of primary conductors 70 are coupled to each stage by a pair of electrical couplings 72. The primary conductor 70 may comprise cables, such as power cables run from the surface. Each stage 40 is connected in parallel to both primary conductors 70 such that if the connection between one of the primary conductors and one of the stages fails, that same stage remains functional by virtue of its connection to the other primary conductor 70. Isolation devices 74, such as fuses, also can be utilized between each stage and each primary conductor 70.

Figure 7:
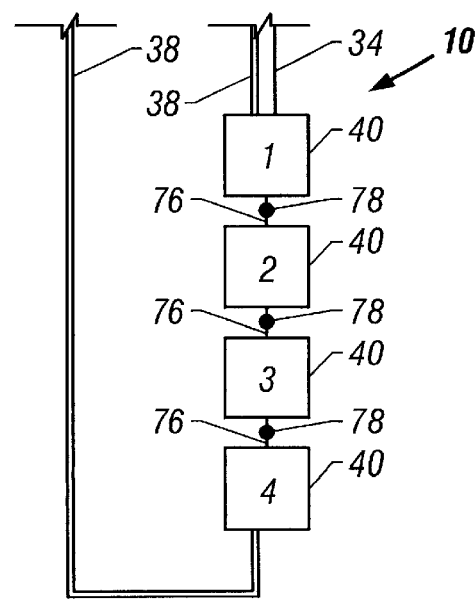
FIG. 7 is another alternate embodiment of the system illustrated in FIG. 4.

Another embodiment, illustrated in FIG. 7, comprises a ring scheme, which is similar to the series scheme illustrated in FIG. 5 with an additional power cable 38. One power cable 38 is coupled to the uppermost stage 40, while the other power cable 38 is coupled to the lowermost stage 40. Each of the stages are electrically coupled to each other by appropriate conductor segments 76. Also, an isolation device 78, such as a fuse, is deployed between each consecutive stage. When a stage fails, the surrounding devices 78 operate to isolate the failed stage, while the power cable 38 coupled to the uppermost stage provides power to stages above the failed stage and the power cable 38 coupled to the lowermost stage provides power to the stages below the failed stage. Other arrangements also can used to provide power to individual stages of integrated system 10, such as multiple independent cables or bundled cables with a specific cable designated for each stage.

In the designs described above, it may be advantageous to utilize a bus or other systems that allow the use of electrical quick-connects so that separate modules can easily be connected and separated either in the factory or at the well site. Such electrical quick-connects work well with mechanical connection methods, such as mating flanges or threaded collars configured to mechanically join one stage to another.

Figure 8:
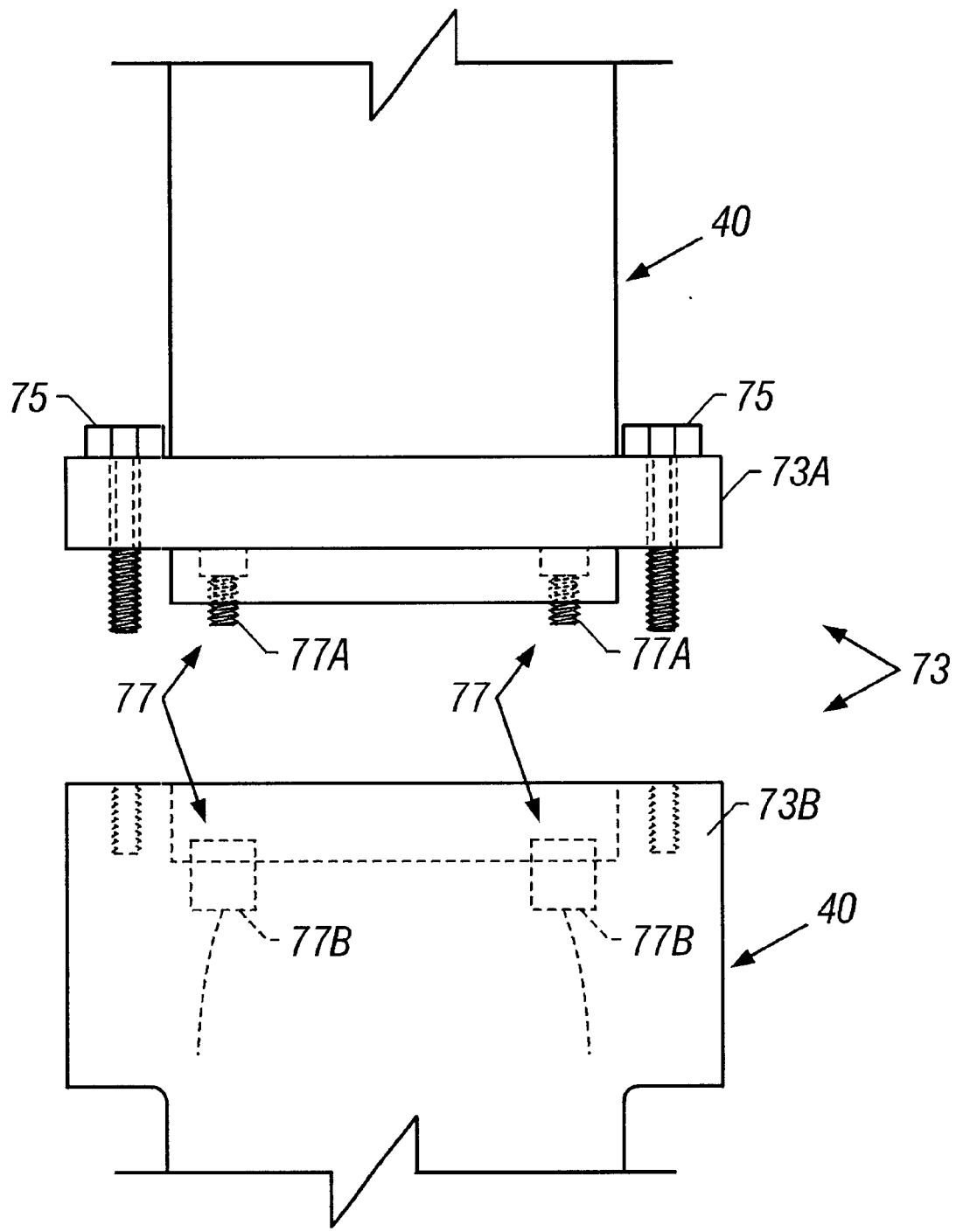
FIG. 8 illustrates exemplary mechanical and electrical quick connects for coupling adjacent stages to each other.

For example, in FIG. 8, a mating flange engagement system is illustrated. In this embodiment, one stage 40 is coupled to a sequential stage 40 by a flange connector 73. Flange connector 73 comprises a flange 73A attached to one end of a given stage 40. Flange 73A is designed for abutting engagement with a corresponding connector end 73B of the next adjacent stage 40. Typically, flange end 73A is fastened to connector end 73B by appropriate fasteners, such as bolts 75 that extend through flange end 73A for threaded engagement with connector end 73B. This arrangement permits the quick connection and disconnection of each stage 40 from its next adjacent stage 40.

Additionally, the system may be designed with appropriate electrical quick-connects 77. The exemplary quick-connects 77 each comprise a male end 77A disposed at the connection end of one of the stages 40 and a female connection end 77B disposed on the corresponding connection end of the next adjacent stage 40. Female ends 77B are arranged to receive male ends 77A when flange end 73A is coupled to connector end 73B. If, for example, the power conductors are routed through sequential stages 40, quick-connects 77 allow rapid connection and disconnection of the conductors during assembly and disassembly adjacent stages.

Figure 9:
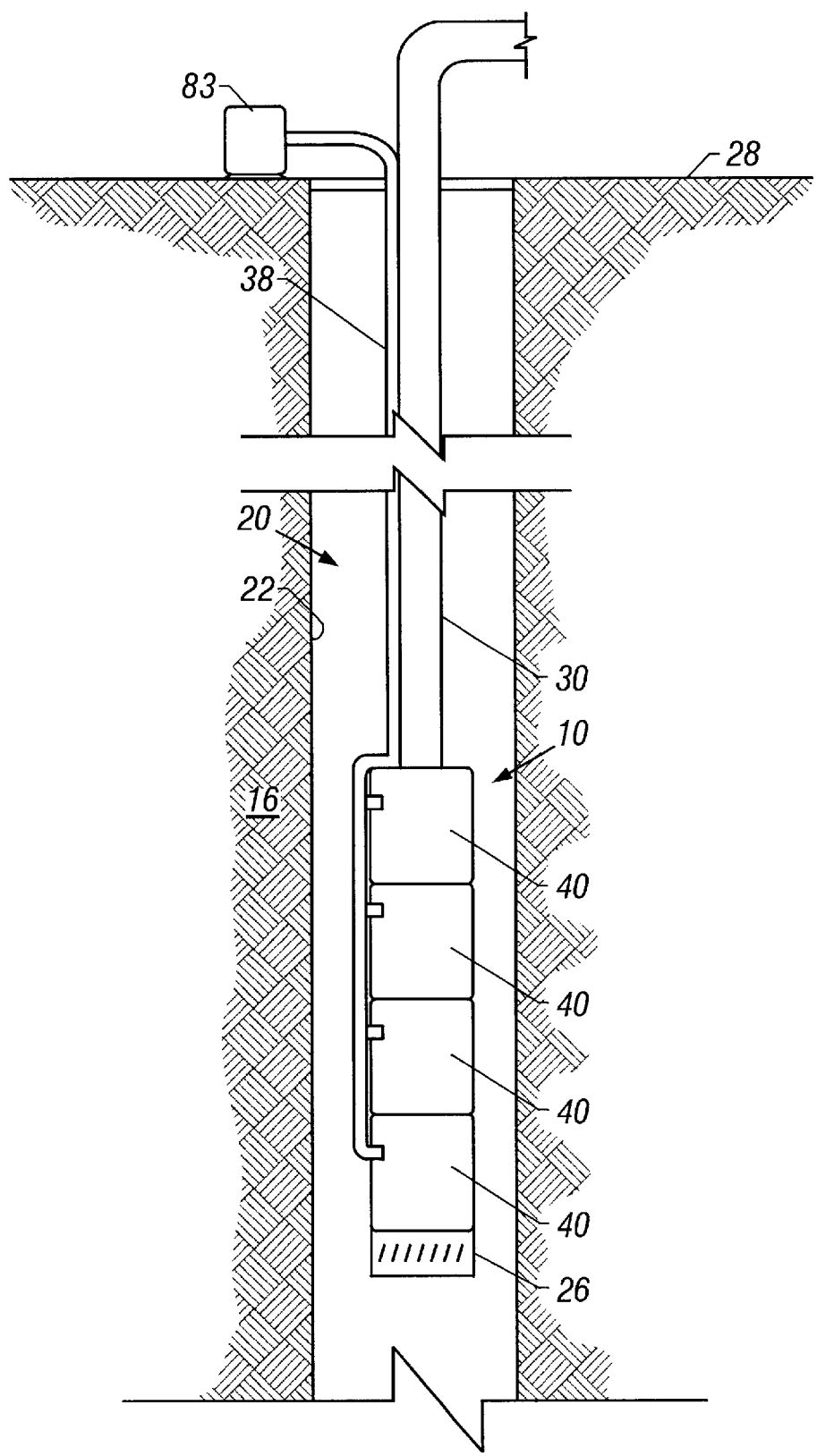
FIG. 9 is a front elevational view of an integrated pumping system and surface-based control system.

A variety of controllers, such as the downhole control module 62 illustrated in FIG. 4 or a surface control module 83 illustrated in FIG. 9, can facilitate the flexibility and adaptability of integrated system 10. A controller, e.g. control module 62 or surface controller 83, is utilized to automatically redistribute power when one stage 40 fails. In fact, potentially greater power can be provided to the remaining stages to maintain a comparable level of fluid production. The controller also can be used to determine when a failure has occurred and/or to take corrective action to compensate for the failure. Exemplary actions that may compensate for failure of a stage are increasing current to remaining stages or increasing the speed of some or all of the remaining stages.

Figure 9A:
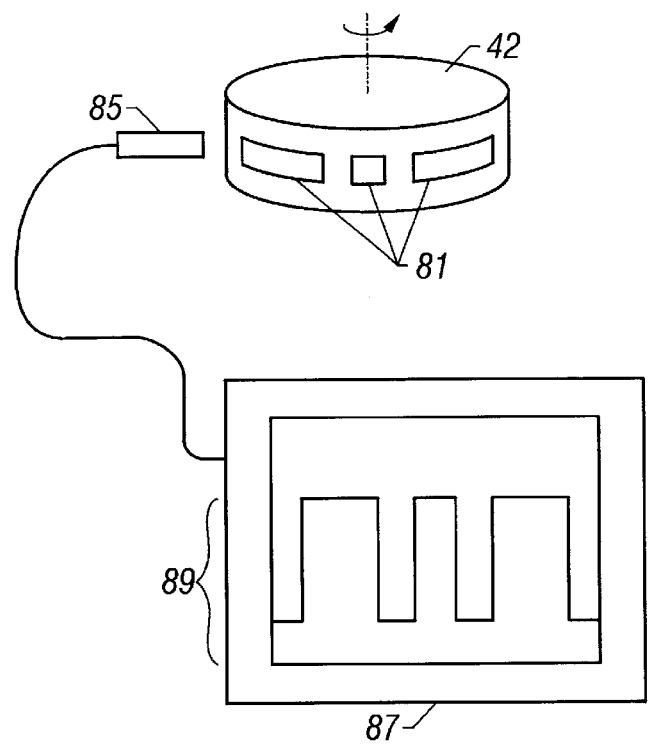
FIG. 9A is a schematic drawing of one exemplary stage sensor system.

If a controller is combined with the integrated pump system, each stage typically includes a mechanism by which it is identified to the controller, e.g. a stage identifier 81 (see FIG. 9A). This allows the controller to determine whether a problem exists at a particular stage and/or the proper action to correct or compensate for the problem. Additionally or in the alternate, each stage can provide an appropriate output to a controller interface, such as a display screen, for analysis by an operator.

There are a variety of mechanisms that can be used as stage identifiers 81 for identifying the operation of each stage, such as bar codes disposed on movable components, e.g. impellers 42. Another type of stage identifier 81 comprises a series of magnets arranged on a movable component of each stage to create a specific signature when sensed by an inductive sensor. Another exemplary stage identifier 81 comprises configuring individual stages to provide an electronically encoded signal in a time sequence with the other stages, e.g. based on rotation of the impeller. For example, a given impeller 42 (or other part of the rotor) can be fabricated with a plurality of notches or other features, represented by stage identifiers 81 in FIG. 9A. The notches are detected by a proximity sensor 85 that outputs a signal to an analyzer 87. The signal is representative of the pattern of notches and is used to create a unique time domain signature 89.

With any of these mechanisms, the signal or signals output to the controller will change upon failure of one or more of the monitored stages. This allows the controller or an operator to compensate for the failed stage or stages. If the controller is located remotely, such as surface controller 83, the output signals can be transmitted through power cable 38. The ability to identify and control individual stages provides an operator great flexibility in operating the pumping system. For example, the operator is able to identify problems in individual stages and to address those problems by controlling the individual stages independently of the other stages.

If desired, other types of sensors can be combined with the individual stages 40 or located proximate integrated system 10. For example, speed sensors can be used with each stage to sense the frequency of rotation and corresponding signals can be output to a controller, e.g. surface controller 83, to provide frequency signatures for each of the stages. Additionally, vibration sensors may be coupled to or incorporated with each stage to sense vibration and output appropriate signals representative of vibration signatures. The signatures are monitored and analyzed by an appropriate controller or operator. Other sensors, such as temperature sensors, pressure sensors, flow sensors etc. may be embedded in one or more stages to sense various parameters and output corresponding signals for analysis and use in evaluating the operation of integrated system 10. Each of the sensed parameters can be utilized to collectively or individually control the various stages to optimize performance of the system. This individual control also allows individual stages or groups of stages to be used as flow control valves.

The flexibility of control permits adaptation of integrated system 10 to many environments. For example, individual stages 40 may be used as flow control valves. When one or more stages are producing from different formations, such as formations A, B and C of FIG. 9B, an operator is able to independently control the stages and hence the flow associated with different formations. The operator simply may turn individual stages or groups of stages on or off to select different production parameters for each formation. This can be advantageous when used for well testing where formations are flowed intermittently or for limiting the effects of coning of fluid from one formation to another. The production speed of each stage or group of stages also can be adjusted based on factors such as gas production, component wear, erosion, etc.

The flexible modular design, as shown in FIG. 3, also allows the use of a variety of other completion elements, such as multiple intakes 48, separator 58, instrumentation component 60, sleeves, generators, flow control valves, test equipment, gas handlers and a variety of other completion components that can be incorporated into a wide range of completion configurations between, above or below the stages. Because electrical power conductors are run along or through the stages, the various other components can be powered without running a separate electrical power cable. Power also can be provided by generators or energy storage units, e.g. batteries, deployed in the completion. For example, instrumentation component 60 may be substituted or supplemented with an electrical generator or battery integrated with system 10. With these potential sources of electric power, internal batteries may not be required for certain testing equipment and hydraulic control lines potentially can be eliminated by switching to electrically actuated components.

Figure 9B:
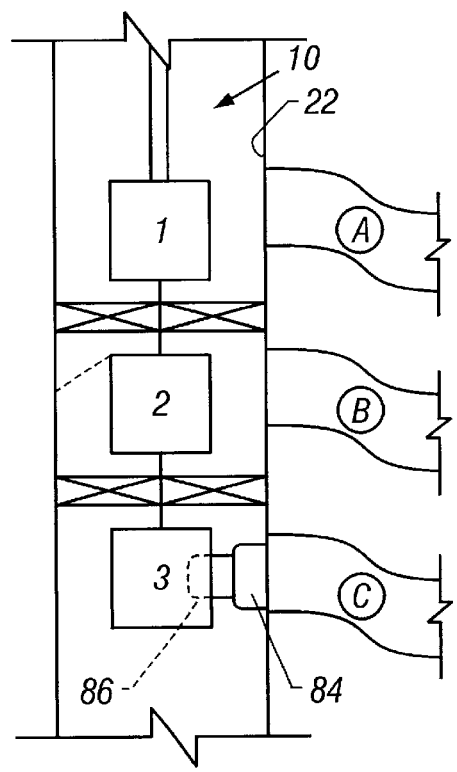
FIG. 9B illustrates an alternate arrangement of the stages of the integrated motor and pump.

The system flexibility also can be supplemented by the ability to use external sensors, such as a sensor 84 illustrated in FIG. 9B. In one exemplary embodiment, sensor 84 is attached to casing 22 and the adjacent stage or stages 40 are coupled to sensor 84 by an electromagnetic coupler 86. In this manner, sensor or sensors 84 can be activated automatically when the integrated system 10 is deployed downhole and an electrical connection is formed via coupler 86. When the stages are retrieved from the downhole environment, the electromagnetic coupling is broken leaving the sensor or sensors 84 in the downhole environment.

Because no shaft is required and the stages may be independently powered, adjacent pump stages can be rotated in opposite directions or at differing speeds. In some applications, rotation of certain stages in opposite directions may improve the torque balance of the overall completion. The counter rotating stages also may diminish undesirable swirling in the production fluid. Apart from pumping in a single direction, the stages readily may be designed to pump fluids in opposite directions (see FIG. 3). For example, if a separator is deployed between stages, the upper stages 40 can be used to pump the separated oil upwardly to the surface while the lower stages 40 are used to pump the separated fluid downwardly to, for example, a dump formation.

Figure 10:
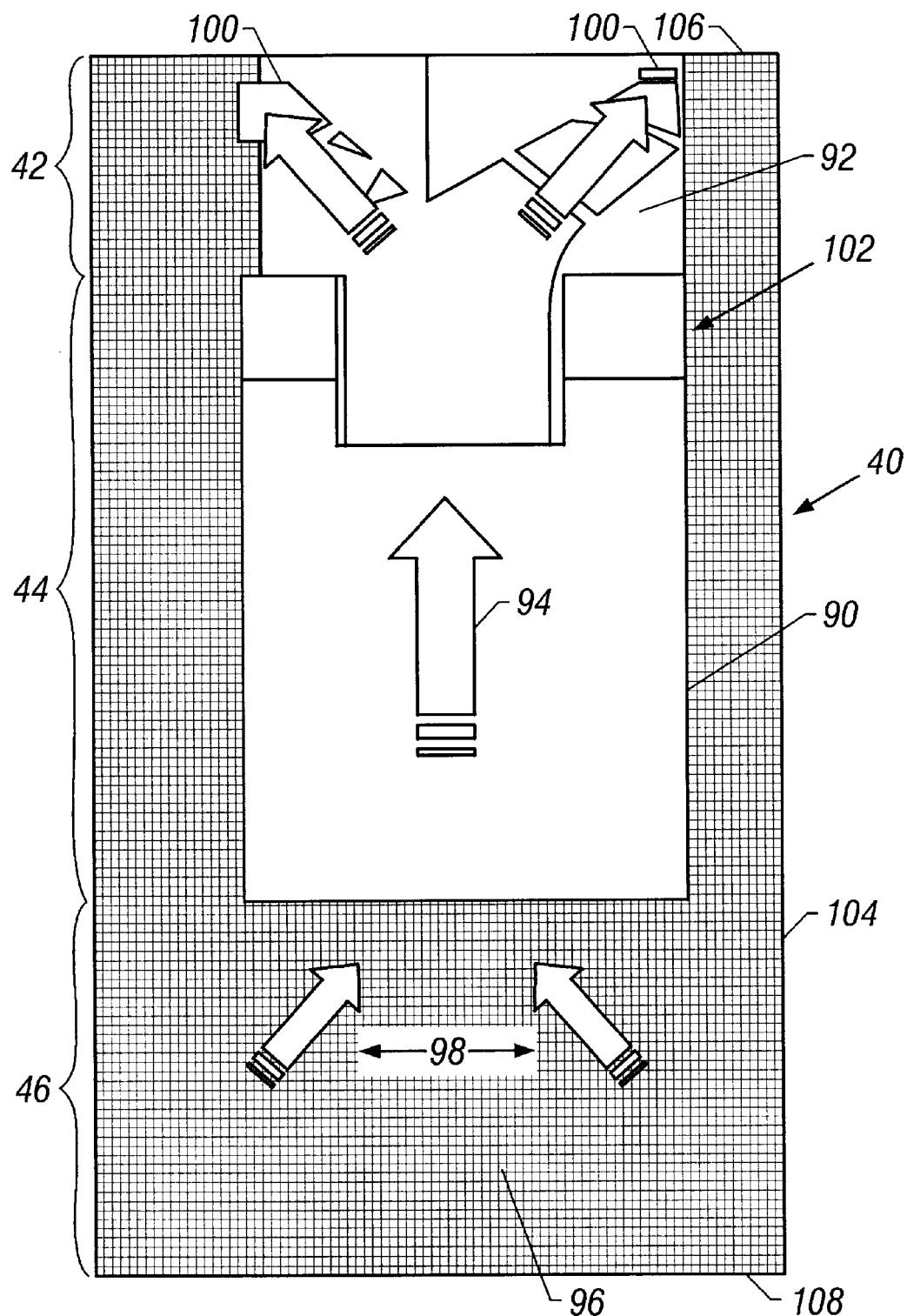
FIG. 10 is a cross-sectional view taken generally along the axis of a stage of the integrated motor and pump, according to one embodiment of the present invention.

Referring generally to FIG. 10, an embodiment of a typical stage 40 is illustrated. Motor section 44 comprises a drive motor 90 that is coupled to and able to rotate an impeller 92 disposed in impeller section 42. Drive motor 90 has an integral fluid flow path 94 into which fluid is drawn from a diffuser 96 disposed in diffuser section 46. Fluid is drawn through diffuser flow passages 98 along flow path 94, through motor section 44 and into a plurality of impeller vanes 100. As impeller 92 rotates, the fluid is forcibly discharged from impeller vanes 100 to the next succeeding stage 40 or out of integrated system 10.

Impeller 92 may be supported by a thrust bearing 102. Additionally, the various internal stage components are enclosed within an outer housing 104 having an upper end 106 and a lower end 108. If stages 40 are designed as modular stages, housing ends 106 and 108 are configured as mounting ends that may be selectively coupled and uncoupled from adjacent components. It also should be noted that the arrangement of components within each stage may be modified. For example, the modular stages may be designed with the diffuser in the upper position, and the impeller disposed between the diffuser and the drive motor.

Figure 11:
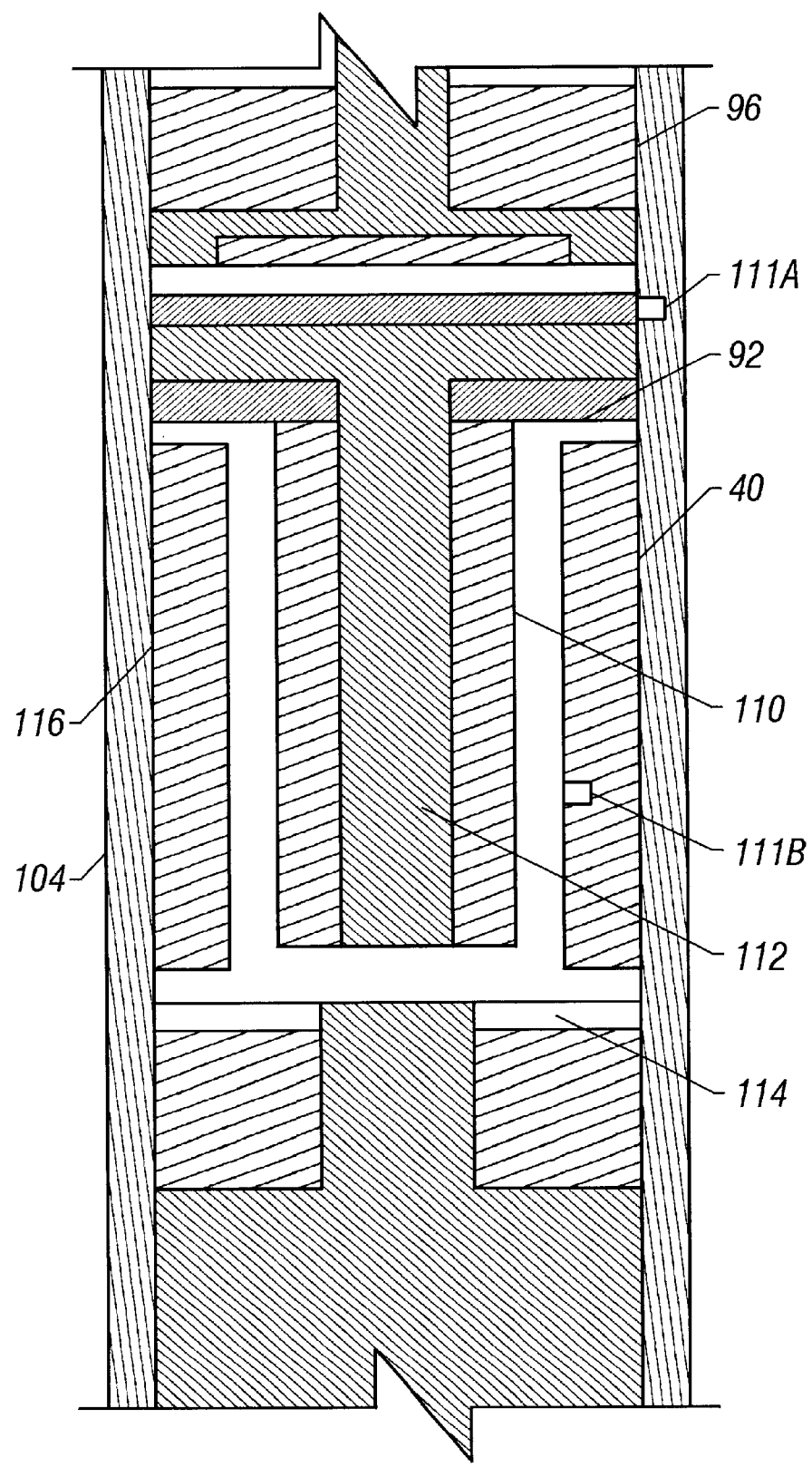
FIG. 11 is a cross-sectional view taken generally along the axis of an exemplary stage.

One embodiment of drive motor 90 is illustrated in FIG. 11. In this embodiment, drive motor 90 comprises a cylindrical rotor motor, such as an ac induction motor. However, drive motor 90 also may comprise other types of motors, such as a reluctance motor, a permanent magnet synchronous motor or a DC motor. The exemplary motor illustrated comprises a motor rotor 110 having a longitudinal flow path 112 therethrough. Rotor 110 is supported by a thrust bearing 114 on a bottom end and is coupled to impeller 92 at an upper end. In this particular embodiment, diffuser 96 is disposed above impeller 92 within the stage 40. However, the stage may readily be designed to accommodate diffuser 96 beneath drive motor 90, as illustrated in FIG. 10. Similarly, thrust bearing 114 may be located beneath impeller 92, as illustrated in FIG. 10. Rotor 110 is surrounded by a stator 116 having a plurality of stator windings utilized to impart rotation to rotor 110, as known to those of ordinary skill in the art.

In this embodiment, as well as other embodiments of drive motor 90, a variety of internal sensors, e.g. sensors 111A and 111B, can be utilized in sensing fluid and/or motor related parameters. For example, sensor 111A may be located proximate impeller 92 to sense speed or vibration. Another exemplary sensor, such as sensor 111B, can be positioned in a variety of locations to sense temperature. The sensors output signals to an appropriate monitor or controller.

Figure 12:
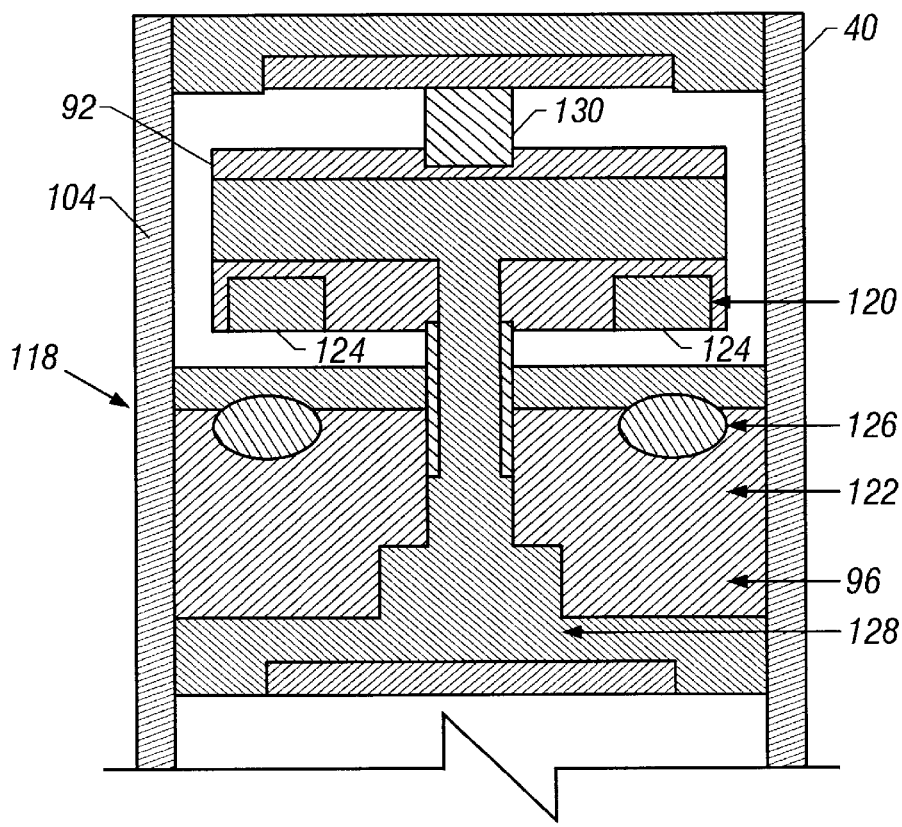
FIG. 12 is a cross-sectional view taken generally along the axis of an alternative embodiment of an exemplary stage.
Figure 13:
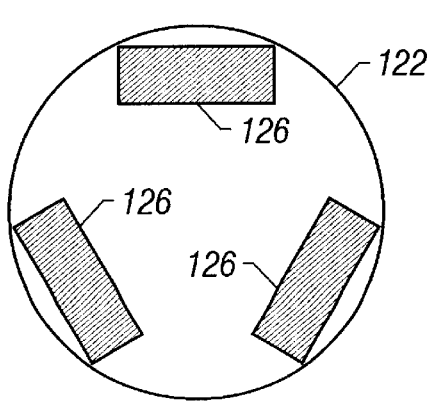
FIG. 13 is a top view of exemplary stator electromagnets illustrated in FIG. 12.
Figure 14:
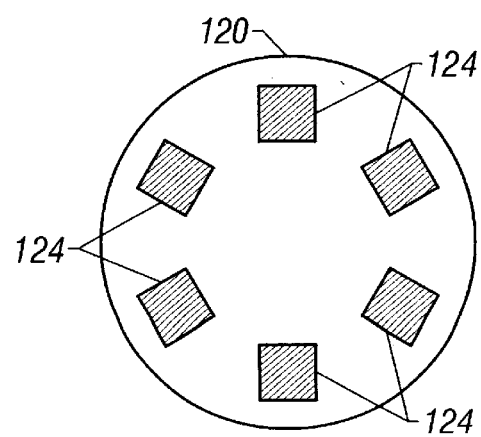
FIG. 14 is a bottom view of exemplary rotor permanent magnets illustrated in FIG. 12.

Another exemplary drive motor 90 is a permanent magnet motor 118, as illustrated in FIGS. 12 through 14. In this embodiment, a rotor 120 is rotatably disposed above a stator 122. Rotor 120 comprises a plurality of downwardly facing permanent magnets 124, as illustrated in FIGS. 12 and 14. Permanent magnets 124 cooperate with a plurality of electromagnets 126 disposed in stator 122 and oriented to face permanent magnets 124, as illustrated in FIGS. 12 and 13. Sequential energization of electromagnets 126 imparts rotational motion to rotor 120 and impeller 92 which is connected to or formed as part of rotor 120. As with the previous designs discussed, fluid is drawn upwardly through diffuser 96, stator 122 and rotor 120 along a flow path referenced as flow path 128(see FIG. 12).

Figure 15:
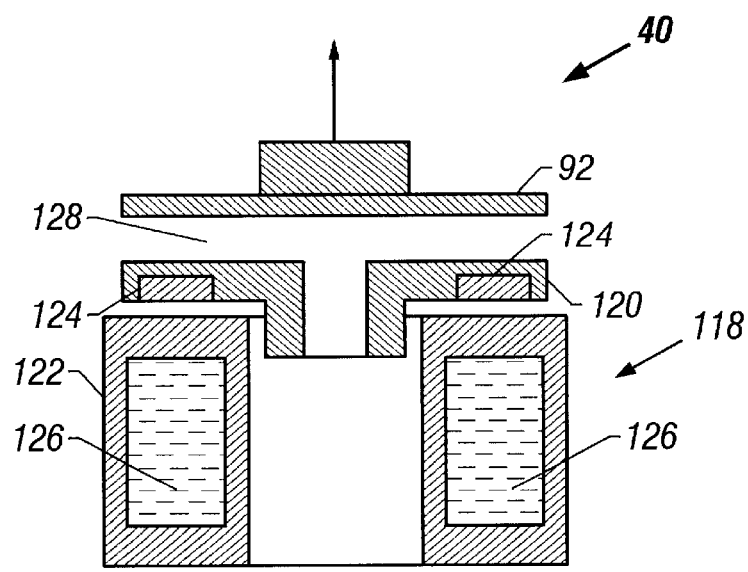
FIG. 15 is a schematic illustration of the stage illustrated in FIG. 12 designed without mechanical constraint on the motion of the rotor.
Figure 16:
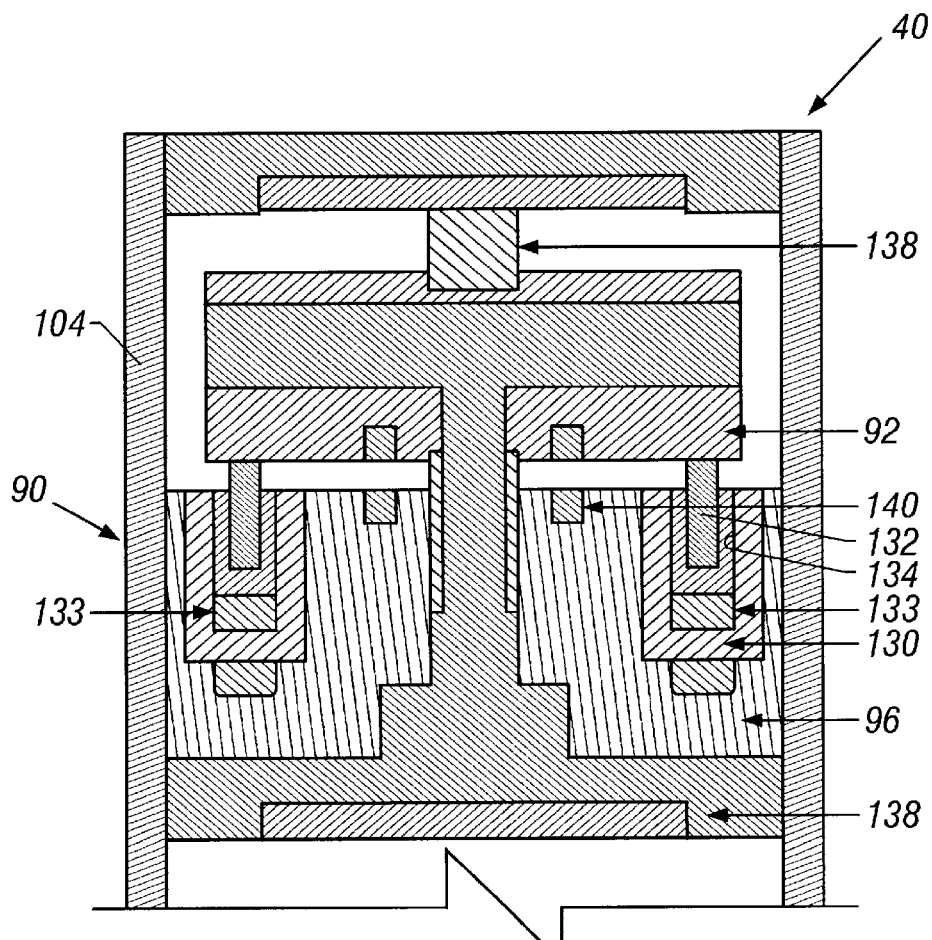
FIG. 16 is a cross-sectional view taken generally along the axis of an exemplary stage utilizing an alternate motor embodiment.

A variety of bearings, such as a radial bearing 130, may be utilized to limit the degrees of freedom that rotor 120 and impeller 92 are allowed to move. However, this type of motor does permit the elimination of one or more of these bearing or wear surfaces by controlling the positioning of rotor 120 and impeller 92 through electromagnetic forces rather than mechanical restraint (see FIG. 15).

By properly aligning the poles the of the magnets and by providing current to the electromagnets, the rotor 120/impeller 92 is levitated by a repulsive force. The impeller can then be rotated by selective energization of electromagnets 126. If additional degrees of freedom are controlled electromagnetically, a plurality of sensors typically are incorporated into the stage to measure the position of the rotor relative to the electromagnets. The sensors can be positioned to determine, for example, axial distance between the electromagnets and the rotor as well as radial displacement of the rotor. The signals from the sensors are output to a controller that adjusts the energization of electromagnets 126 to control the positioning and rotational speed of rotor 120/impeller 92.

Depending on whether physical bearings are utilized and the desired level of control over impeller 92, no sensors or multiple sensors may be used to detect impeller position. In a physically constrained system, e.g. the system illustrated in FIG. 12, sensors can be avoided in an open loop system. However, sensors often are utilized to detect parameters such as speed of rotation and/or levitation of the impeller. In unconstrained systems, e.g. the system illustrated in FIG. 15, additional sensors may be used to accurately detect positions of the impeller along multiple degrees of freedom. For example, six sensors could be utilized to detect movement in any of the six degrees of freedom. Other sensors, such as temperature and pressure sensors, also can be incorporated into the design.

Another exemplary embodiment of an integrated pump and motor is illustrated in FIGS. 16 through 19. In this embodiment, a solenoid drive motor utilizes generally C-shaped solenoids 130 that cooperate with a skirt 132. Solenoids 130 comprise windings 133, e.g. copper windings, disposed proximate a recessed or air gap area 134 sized to receive skirt 132. Skirt 132 comprises alternating ferritic sections 135 and non-ferritic sections 135A, as illustrated schematically in FIG. 17. By sequentially energizing the windings 133 of solenoids 130, the resultant magnetic attraction or repulsion acts on the alternating ferritic sections to rotate skirt 132 along recessed section 134.

As illustrated, skirt 132 is coupled to impeller 92 to provide impeller rotation. When the impeller is rotated, fluid is drawn along a fluid flow path 136 through diffuser 96, drive motor 90 and impeller 92 which discharges the fluid to the next sequential component. In this design, impeller 92 may be held for rotation about its axis by appropriate bearings, such as a radial bearing 138. Additionally, permanent magnets 140 may be disposed at a lower portion of impeller 92 and an upper portion of diffuser 96 to provide a separation force or repelling force between the impeller 92 and diffuser 96. This repellant force facilitates separation of the components during operation of the stage.

In a typical application, the legs of the C-shaped solenoids 130 are generally rectangular in cross-section, as illustrated in FIGS. 17 and 18. By appropriately interrupting current to the solenoids on a periodic basis, the ferritic sections of skirt 132 are moved along recess 134 in a rotating manner, as known to those of ordinary skill in the art. However, the need to interrupt the current can be obviated by changing the rectangular profiles of the C-shaped solenoids to divergent portions 144, as illustrated in FIG. 19. Each divergent portion 144 is constructed with a lead edge disposed closer to skirt 132 than its trailing edge to create the divergent profiles. In the specific embodiment illustrated, each portion 144 is broader in cross section at its lead end and narrower at its trailing end. As a ferritic section 135 of skirt 132 is drawn through divergent sections 144, the divergence sufficiently reduces the electromagnetic force of the solenoid 130 such that the ferritic section passes through divergent portion 144, allowing skirt 132 and impeller 92 to continue rotating. It should be noted, however, that a wide variety of drive motor configurations, impeller configurations, diffuser configurations and arrangements of components can be used in constructing stages 40 without departing from the scope of the invention.

In each of the exemplary embodiments, the integrated motor and pump allows for the elimination of various components necessary in conventional electric submersible pumping systems. For example, no shaft is required to couple a submersible motor to a separate submersible pump. Additionally, no internal motor oil is required which not only eliminates the need for motor oil but also for various elastomers, such as seals, e.g. shaft seals. The lack of motor oil also obviates the need for a motor protector disposed intermediate a submersible motor and a separate submersible pump.

Overall, it should be understood that the foregoing description is of exemplary embodiments of this invention, and that the invention is not limited to the specific forms shown. For example, the use of integrated motor and pump stages can be used in a variety of applications other than downhole applications; the independent stages may be combined in a unitary structure or constructed in modules that are readily connected with other stage modules as well as other types of components; the various control systems may vary based on environment, components utilized in the integrated system and the type of drive motor utilized; and the number and size of stages and other components can be adapted to various applications. Also, the specific design of each stage may vary or be adapted to new pump, motor and material technologies. These and other modifications may be made in the design and arrangement of the elements without departing from the scope of the invention as expressed in the appended claims.

What is claimed is:

1. An integrated pumping system, comprising:
a plurality of stages sequentially connected, each stage comprising a diffuser, a drive motor and an impeller, wherein one or more of the plurality of stages acts as a flow control valve to decrease a flow of fluid.

2. The integrated pumping system as recited in claim 1, wherein each stage of the plurality of stages is independently controllable.

3. The integrated pumping system as recited in claim 1, wherein each stage of the plurality of stages are independently controllable to maintain operation of an operable stage if one or more other stages fail.

4. The integrated pumping system as recited in claim 1, wherein the impeller of each stage may be rotated at a unique speed relative to impellers of other stages of the plurality of stages.

5. The integrated pumping system as recited in claim 2, further comprising a control module coupled to each stage.

6. The integrated pumping system as recited in claim 5, wherein the control module is retrievable independent of the plurality of stages.

7. The integrated pumping system as recited in claim 1, further comprising a bus to provide power to the plurality of stages.

8. The integrated pumping system as recited in claim 1, further comprising a plurality of individual conductors to provide power to the plurality of stages.

9. An integrated pumping system, comprising:
a plurality of stages sequentially connected, each stage comprising a diffuser, a drive motor and an impeller, further comprising a electrical quick-connect disposed between at least two of the stages.

10. An integrated pumping system, comprising:
a plurality of stages sequentially connected, each stage comprising a diffuser, a drive motor and an impeller, wherein each stage of the plurality of stages comprises a stage identifier to provide information to a control module regarding at least one parameter of the stage.

11. The integrated pumping system as recited in claim 10, wherein the stage identifier comprises a bar code.

12. The integrated pumping system as recited in claim 10, wherein the stage identifier comprises a series of magnets.

13. The integrated pumping system as recited in claim 10, wherein the stage identifier comprises a mechanism configured to provide an electronically encoded signal in a time sequence with other stages.

14. The integrated pumping system as recited in claim 10, wherein the mechanism comprises a series of notches on each impeller.

15. The integrated pumping system as recited in claim 10, wherein each stage further comprises a parameter sensor.

16. The integrated pumping system as recited in claim 15, wherein the parameter sensor comprises a speed sensor.

17. The integrated pumping system as recited in claim 15, wherein the parameter sensor comprises a temperature sensor.

18. The integrated pumping system as recited in claim 15, wherein the parameter sensor comprises a vibration sensor.

19. The integrated pumping system as recited in claim 10, wherein the drive motor comprises an induction motor.

20. The integrated pumping system as recited in claim 10, wherein the drive motor is free of lubricating oil.

21. A pumping system, comprising:
an outer housing; and
a plurality of internal impellers, wherein rotation of each of the internal impellers is independently controlled, wherein each impeller comprises an identifier that can be recognized by a controller as an indication of one or more operating parameters.

22. The pumping system as recited in claim 21, further comprising a plurality of internal motors, wherein each motor is integrated with a corresponding internal impeller.

23. The pumping system as recited in claim 22, wherein the plurality of internal motors are independently controlled by a controller.

24. The pumping system as recited in claim 22, wherein the plurality of internal motors comprise induction motors.

25. A system for moving a fluid, comprising:
a pumping system having a plurality of stages, each stage comprising a drive motor having an internal flow path to receive a produced fluid therethrough, an impeller, and an identifier associated with the impeller that can be recognized by a controller as an indication of one or more operating parameters.

26. The system as recited in claim 25, wherein each stage comprises a diffuser.

27. The system as recited in claim 26, wherein the impeller of at least one of the stages may be rotated at a speed different from other impellers.

28. The system as recited in claim 25, wherein each stage of the plurality of stages is independently controllable.

29. The system as recited in claim 25, wherein the drive motor comprises an induction motor.

* * * * *